Patented Apr. 22, 1941

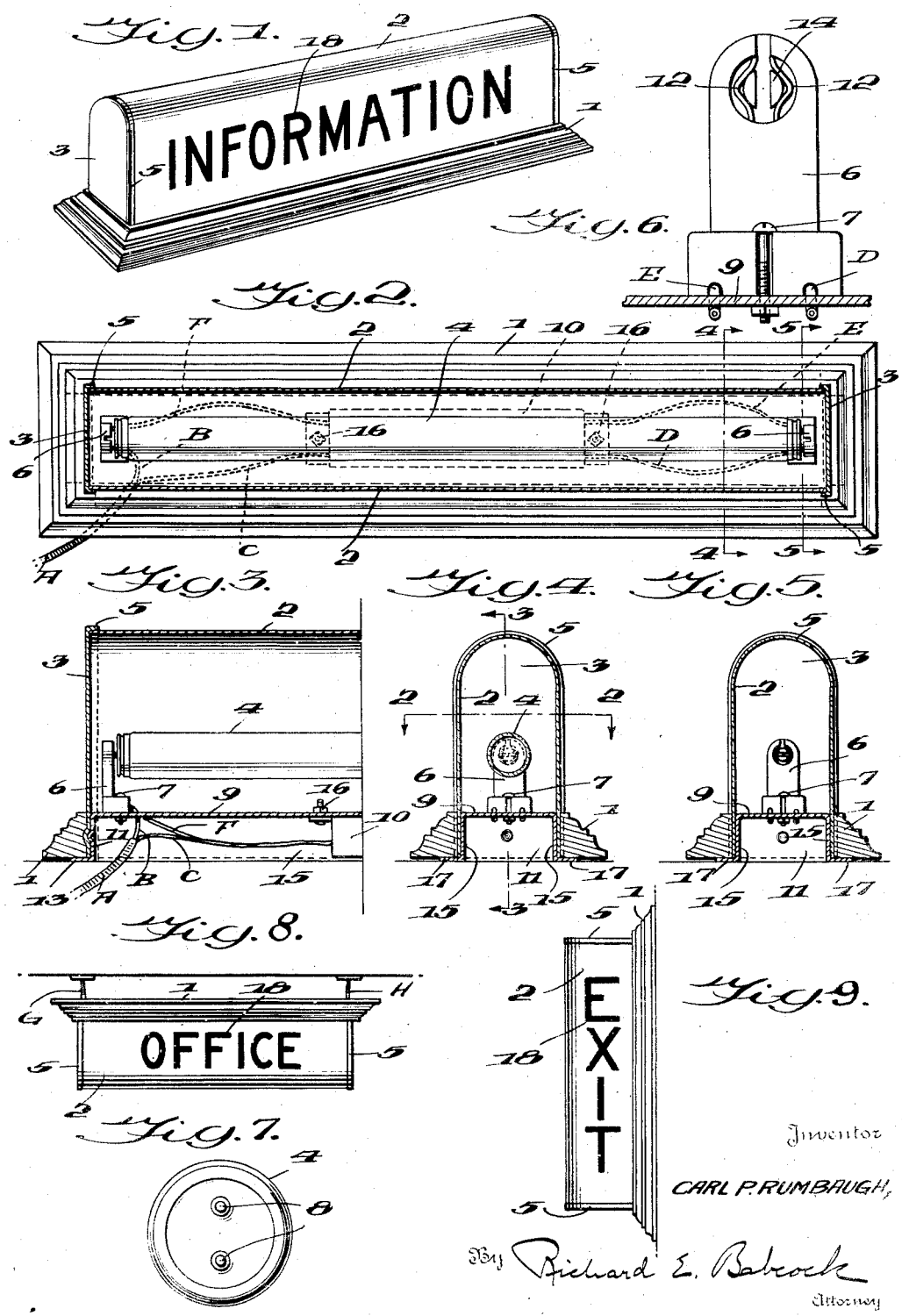

2,239,343

UNITED STATES PATENT OFFICE 2,239,343

ILLUMINATION UNIT

Carl P. Rumbaugh, Lancaster, Pa.

Application February 15, 1939, Serial No. 256,579

3 Claims. (Cl. 40—132)

This invention relates to illumination units or signs, and is primarily intended for use in the field of illuminated signs, but is not necessarily restricted thereto, considered in its broader aspects.

While not restricted, considered in its broadest aspects, to non-glass transparent or translucent illuminated elements, considered more narrowly and from a different viewpoint my invention resides in the use of a stiffly flexible self form retaining transparent or translucent plastic nonglass body or illuminated element in combination with a cold light source of uniform illumination, and associated elements necessary to a complete unit.

The primary objects of my invention, considered in its broader aspects, are to provide a flexible sheet form resinous plastic or other flexible plastic material in combination with a cold light illuminating element and means for maintaining the transparent or translucent sheet material in position; slightly less broadly considered my invention has as an important object the combination with a cold source of uniformly distributed light of a stiffly flexible transparent sheet material and suitable casing elements for closing the ends and bottom of the plastic sheet and maintaining it in proper relationship in the sign or illuminating element or unit, wherein it will be maintained in elongated U-shaped form in cross-section in the preferred type of my invention, or in the type of sign primarily in view by my invention.

Considered more narrowly, the objects of my invention are to provide the combination of a single elongated uniform light illuminating element or lamp in combination with a stiffly resilient transparent or translucent sheet form body which may be bent to a relatively thin sharp U-shaped form in cross-section, and a frame for holding all edge portions of said sheet material in proper position to maintain the proper shape of such plastic sheet material and to close the interior of the chamber defined by said plastic material against the ingress of the elements and to support the illuminating element or lamp in proper position in the interior of said chamber, said frame also serving as means for supporting, suspending or mounting the sign or illumination unit in proper or desired position or place.

Further objects are to provide a single light weight illuminated sign or illumination unit embracing a transparent or translucent light plastic body disposed about three sides of a source of light in association with a single uniform light source of illumination, a frame for maintaining the body in proper shape and for maintaining the proper association between said body and said source of light, and a light weight converter carried by a part of said frame and serving to modify the electric current received from the usual house or other source of supply and prior to its passage through the lamp or other source of light, all of said elements as associated resulting in a durable pleasing appearing illumination unit or sign self contained and of extremely light weight which may be safely suspended from any suitable support either outside or out of doors subject to the influence of the elements or indoors without need for expensive suspension fittings and without risk of its being torn loose due to its weight and injuring passers-by or bystanders.

In the accompanying drawing:

Figure 1 represents a perspective view of an illumination unit or sign embodying my invention;

Figure 2, a horizontal cross-sectional view looking downward and taken on the line 2—2 of Figure 4;

Figure 3, a vertical longitudinal sectional view on the line 3—3 of Figure 4, looking in the direction of the arrows, the lamp or illuminating element being shown in elevation;

Figure 4, a vertical cross-sectional view on the line 4—4 of Figure 2, looking in the direction of the arrows;

Figure 5, a section on the line 5—5 of Figure 2, looking in the direction of the arrows;

Figure 6, an enlarged detail elevation of one of the tubular lamp bracket sockets as mounted on the sheet metal base 9;

Figure 7, an end elevation of the illuminating tube or lamp 4 showing the contact pins 8 provided at each of the respective ends of said lamp;

Figure 8, a side elevation of a sign embodying my invention as suspended for use either outdoors or in the interior of a building; and, Figure 9, a side elevation of a sign embodying my invention mounted in vertical position either on an interior or exterior wall or other vertical support.

Referring now in detail to the drawing, I designates an oblong quadrilateral frame comprising side bars and end bars together defining an oblong quadrilateral central opening.

Ends or closure plates 3 preferably of sheet metal, are secured against the inner faces of the end bars of the frame I by any suitable means such as for instance screws, not shown, to be held firmly in position in the frame 1. Each of these end plates 3 is formed with a marginal continuous flange 5 preferably not exceeding one-fourth of an inch in width or length considered endwise of the sign as a whole, the flanges 5 of said plates 3 being presented toward each other so as to constitute sockets overlappingly receiving the respective end portions of the transparent or translucent illuminated stiffly flexible body of the sign or plastic sheet element 2.

A preferably light upwardly dished sheet metal base, insert or closure 9 having depending side walls 15, formed with laterally outwardly extending marginal flanges 17 and depending end walls 11 formed with outwardly endwise extending marginal flanges 13 is fitted into the central opening in the base or frame 1 and is of such width as to just allow the marginal side portions of the plastic element 2 to be snugly received with a close fit between the respective opposed faces of the respective depending walls 15 and the respective side bars of the frame 1, and is of such length as to make a snug snapping fit between the opposed faces of the end bars of the frame 1. This closure or base element 9 is upwardly dished to provide a space or pocket in which to locate the converter or transformer 10, secured to the base 9 by means such as nuts and screws 16 as illustrated in Figures 2 and 3. As so disposed the lower face of the converter or transformer 10 will be located slightly above the lower faces of the marginal flanges 17.

Preferably as assembled the upper face of the base 9 will lie approximately flush with the extreme upper face portion of the frame 1.

Preferably the central lower portions of the plates 3 will be formed with central outward depressions to permit outwardly pressed or protruded portions of the end walls 11 to snap thereinto to provide easy means of holding the base 9 yieldingly in position. However, while this is preferred, it is not essential.

Illuminator or lamp end supporting brackets and electrical contact sockets 6 are respectively secured to the upper face of the base 9 as by means of bolts 7, have contact elements 12 mounted therein as well as a rotatable slotted member 14, the slot of which is adapted to be aligned with an egress and ingress slot to receive the contact pins 8 on the corresponding respective ends of the illuminator or lamp 4.

The lamp or illuminator construction and the bracket socket construction as to details may be of the construction such as shown in Patent Number 2,137,174, granted November 15, 1938 to A. J. Marshaus.

However while the construction and arrangement of the illuminator or lamp 4 and its co-operating socket brackets 6 is preferred, these are but details and insofar as the details thereof are concerned they are not of my invention and are not essential to my invention and any other light weight cold light source of illumination and means of providing and mounting the same in fixed and properly spaced relationship with regard to the other elements of the illumination unit or sign are to be considered as equivalents for the construction shown.

From the foregoing description taken in connection with the drawing it will be seen that the transparent or translucent sheet material 2 is of unbroken area from side to side and end to end, and that at no point above frame 1 is there any element interposed between the tubular lamp or illuminator 4 and any portion of the transparent or translucent sheet material sign body 2 in such a way as to cast a shadow on any portion of the body 2 or to in any way interfere with the full transmission of light thereto. In other words the body or plastic material 2 is confined in one direction between the upper faces of the flanges 17 and the lower faces of the upper portions of the flanges 5; is confined in an endwise direction between the opposing inner faces of the end plates 3; and is confined in a transverse direction between the opposed side portions of the respective flanges 5 and also by the respective sides 15 of base 9 opposed to the respective faces of the respective side bars of the frame 1, receiving between them the respective marginal side portions of the sheet material or body 2 and as confined between these marginal confining elements the sheet material or body 2 is self sustaining.

The wire connections are very simple. The usual so-called electric cord or wire, that is dual wire A is provided on its outer ends with the usual fitting to be plugged into the usual base or wall socket of the usual house or store electric system. One of the wires B of this dual wire A is connected to one of the contacts 12 of one of the socket brackets 6. The other wire C of dual wire A is suitably connected to converter or transformer 10 from which a wire D leads to the corresponding contact 12 of the other socket bracket 6. Wire E leads from the other contact 12 of the latter socket bracket 6 to a suitable connection of the converter or transformer 10, and lastly a suitable wire F leads from the corresponding connection on the converter or transformer 10 to the remaining contact 12 of the first mentioned socket bracket 6, so that when the illuminator or lamp 4 is inserted in the brackets 6 and partially rotated until its respective contacts 8 or its respective ends make contact in the elbows with the contacts or plates 12 electrically operative conditions will be established, assuming that the contact plates 12 are electrically connected with a source of supply.

While Bakelite is preferred as the material to be used for body 2, other plastics may be employed, such for instance as catelin or Lucite of the resinous plastic group and of course other transparent or translucent stiffly flexible thin sheet plastic materials may be employed to serve the function of body 2.

In practice it is found that Bakelite has less tendency to shrink and warp or shrink or warp under the influence of heat or warmth than other plastic sheet materials known to me and for this reason its use is preferred by me as making it practical to use much narrower or shorter, in a lengthwise direction of the sign, end flanges 5, whereby it is made practical to avoid the use of unsightly excessively wide end flanges 5, with a resulting increase in the pleasing appearance of the finished sign.

Of course the sign may be made in different forms from that shown in the present case, the sides of the body 2 need not be parallel to each other at any point in a vertical direction, as shown for instance in Figures 4 and 5, but may diverge from each other or may converge toward each other. Likewise the proportions of the sign or illumination unit may vary considerably and the body as bent into form may be wider in proportion to its height or may be narrower in proportion to its height.

The unit or box of course may be mounted on a wall or surface directly over a wall electric outlet or connection, so that the means or source of electric supply or the electric wiring would not be externally visible, as illustrated for instance in Figures 1 and 9. Where the sign is suspended as in Figure 9 the electric supply cord A may be run down through chain G for instance or through suspending chain H according as may be most convenient, and said chains may be attached directly to the frame 1 or may be attached to the base 9 in which case however base 9 will need to be, or preferably should be, secured to the base 1 by some positive means other than the snapping effect into the frame 1, such for instance as screws, not shown, or bolts or other means suitable to the purpose.

By the use of a cold light illuminator or lamp such as 4 in association or combination with a transparent or translucent body such as 2 and means for maintaining the body 2 in proper position solely by engagement with the edges or marginal portions thereof, thus avoiding the interposition of any elements between the source of light and the body 2 to cast shadows thereon, it is made practical to provide or obtain an illuminating unit or sign which is subjected to a uniform degree of light throughout its length and breadth in a much more efficient manner or degree by employing only twenty watts than could be obtained by the use of a plurality of hot bulb lights or a single hot bulb light requiring a hundred watts, and with the higher wattage the illumination would not be uniform, and to obtain an illuminated body of greater depth than has heretofore been common. By the term "depth" I mean distance from the crest of the inverted cross-sectional U to the upper surface of the frame 1 or of the base 9.

I claim:

1. An electrically operated illumination unit comprising a frame, a pair of end plates projecting from said frame, a thin light transmitting stiffly flexible illuminable hollow body disposed in said frame with its ends closed by said end plates, means carried by said end plates for engaging the marginal end portions of said body to confine the same in combination with an upwardly dished base fitting into said frame and serving to close the open side of said body and to engage the marginal side portions of said body to confine the body against bodily downward movement, a cold light lamp mounted on the upper face of said base, and an electric current modifier mounted on the lower face of said base and received within the dished formation of said base.

2. An electrically operated illumination unit comprising a frame, a pair of end plates projecting from said frame, a thin light transmitting illuminable hollow body disposed in said frame with its ends closed by said end plates, means carried by said end plates for engaging the marginal end portions of said body to confine the same against bodily movement sidewise and bodily vertical movement, in combination with an upwardly dished base fitting into said frame and serving to close the open side of said body and to engage the marginal side portions of said body to confine the body against bodily downward movement, a lamp mounted on the upper face of said base, and an electric current modifier mounted on the lower face of said base and received within the dished formation of said base.

3. An electrically operated illumination unit comprising a frame, a pair of end plates rigidly connected to and projecting from said frame, a thin light transmitting illuminable body substantially U-shape in cross-section disposed in said frame with its ends closed by said end plates, flanges carried by said end plates for overlapping and engaging the external face of the marginal end portions of said body around the curved portion thereof and at points of the vertical walls of said body, the inner faces of said end plates being adapted to engage the respective opposed end edges of the body, in combination with an upwardly dished base fitting into said frame and having end walls and side walls depending from the main panel of said base, flanges extending laterally outwardly from said side walls and engaging the side edges of said body to hold said body in position in said frame, a lamp, means for mounting said lamp on the upper face of the main panel of said base, and a current modifier mounted on the lower face of said main panel.

CARL P. RUMBAUGH.